United States Patent [19]

Deinzer

[11] Patent Number: 4,669,108
[45] Date of Patent: * May 26, 1987

[54] WIRELESS HANDS-FREE CONFERENCE TELEPHONE SYSTEM

[75] Inventor: Gerald J. Deinzer, Chicago, Ill.

[73] Assignee: Teleconferencing Systems International Inc., Arlington Heights, Ill.

[*] Notice: The portion of the term of this patent subsequent to Nov. 26, 2002 has been disclaimed.

[21] Appl. No.: 770,107

[22] Filed: Aug. 28, 1985

Related U.S. Application Data

[63] Continuation of Ser. No. 496,904, May 23, 1983, Pat. No. 4,555,592.

[51] Int. Cl.$^4$ ............................................. H04Q 7/04
[52] U.S. Cl. ..................................... 379/61; 379/58; 379/206; 379/202
[58] Field of Search ............... 179/2 E, 2 EA, 18 BC; 381/91

[56] References Cited

U.S. PATENT DOCUMENTS 4,555,592 11/1985 Deinzer .............................. 179/2 E Primary Examiner—Robert Lev
Attorney, Agent, or Firm—James N. Videbeck

[57] ABSTRACT

A wireless hands-free conference telephone system includes an FM transmitter having multi-directional sound pick-up capability and battery power is adapted for remote wireless transmission of sounds originating in the area adjacent the transmitter to a unitary receiver, amplifier and voice switcher adapted for signal conducting connection to a conventional telephone system. The receiver portion of the unitary system is adapted for receiving the signal from the FM transmitter. The amplifier provides power to drive loudspeakers which radiate the sound incoming from the telephone system. A voice switching circuit is positioned between the telephone, the transmitter and the loudspeaker circuit, and is able to ascertain signal strength from the transmitter circuit and the incoming telephone line, discern which is the stronger signal, and increase the gain of that signal while decreasing the gain of the opposing signal.

6 Claims, 3 Drawing Figures

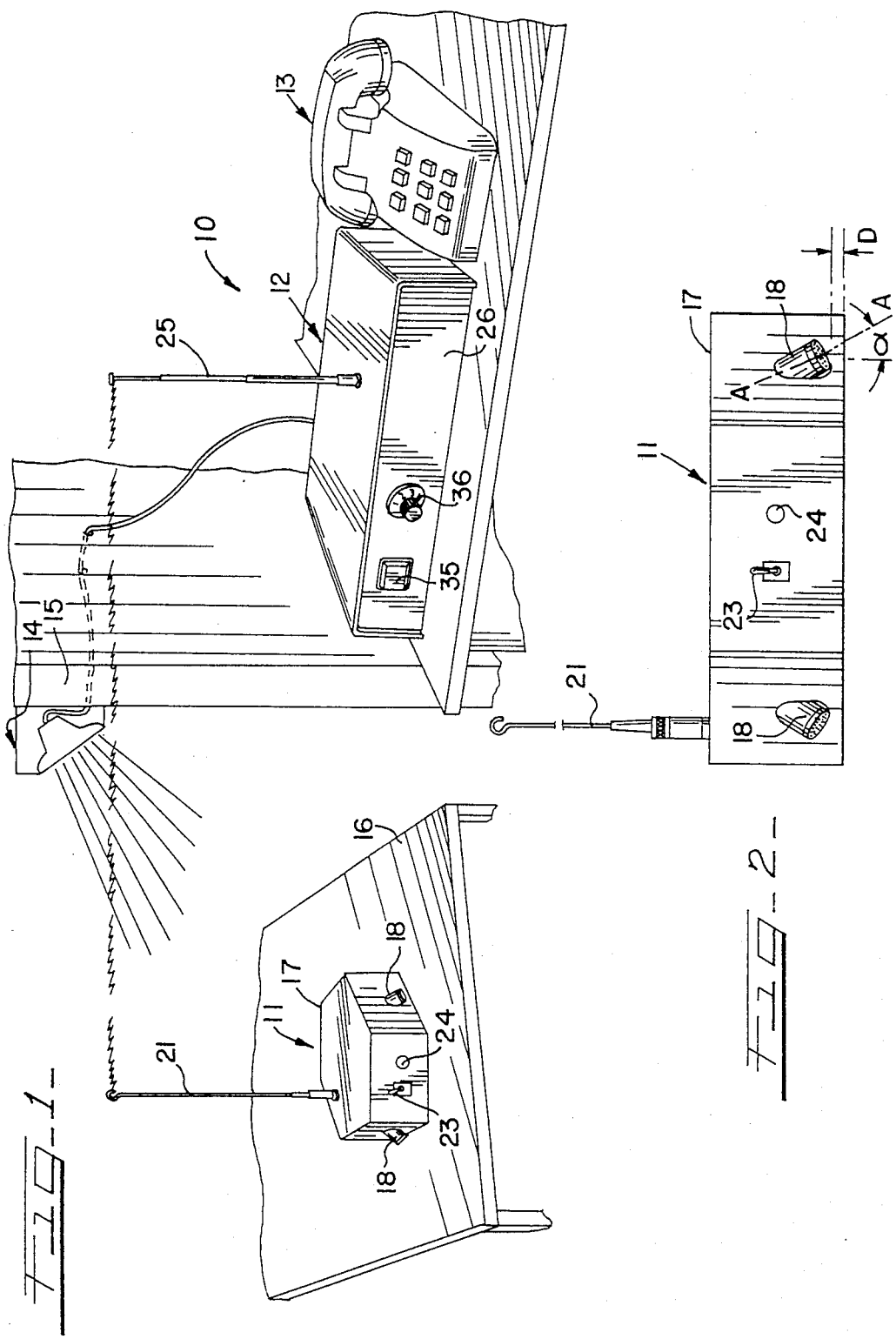

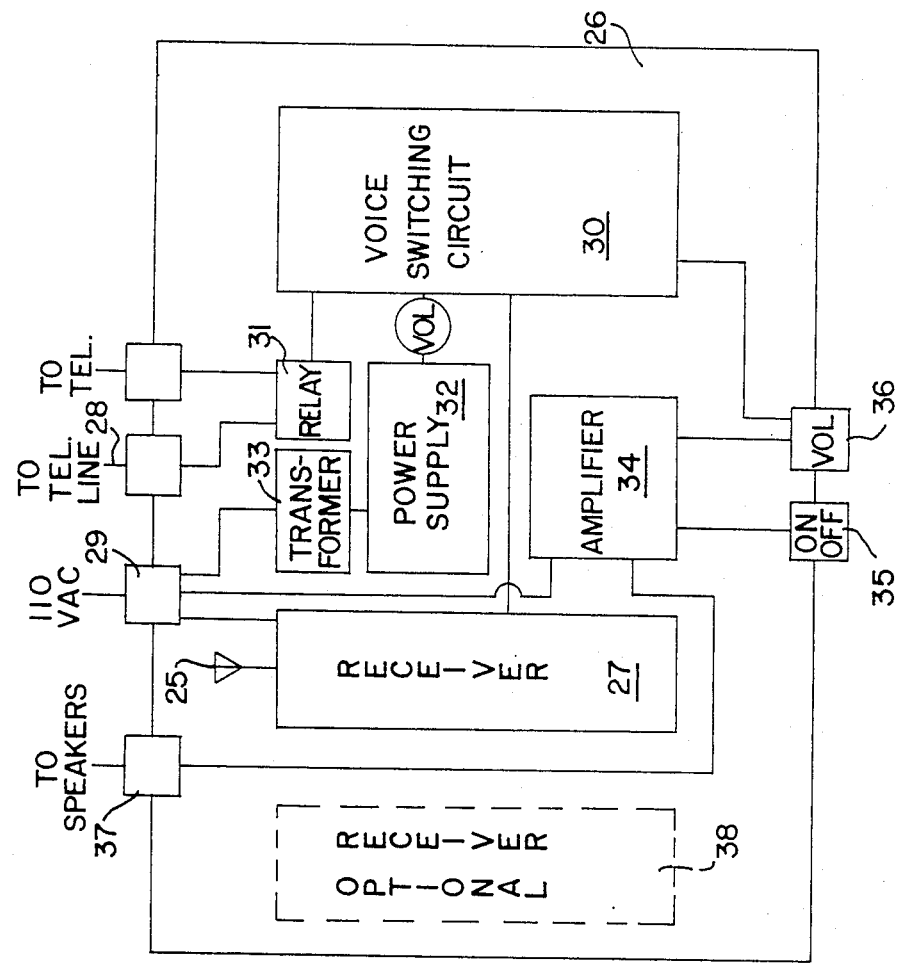
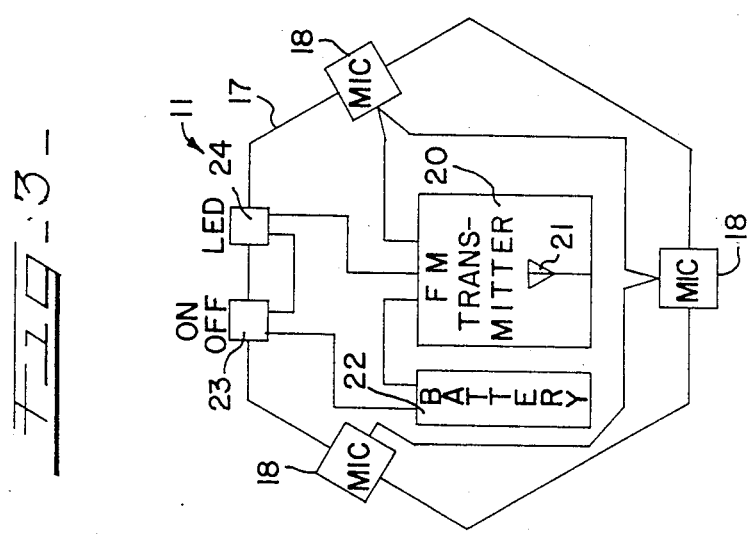

WIRELESS HANDS-FREE CONFERENCE TELEPHONE SYSTEM

This is a continuation of application Ser. No. 496,904, filed May 23, 1983, now U.S. Pat. No. 4,555,592.

BACKGROUND OF THE INVENTION

This invention relates to hands-free telephone systems, and more particularly, to a wireless hands-free conference telephone system adapted for signal connection to a conventional telephone unit.

Heretofore, hands-free type telephone systems have utilized wired transmission means to send a signal from a microphone or transducer into the conventional telephone transmission system. Wireless transmitting units have previously been used in mobile telephone systems for boats, automobiles and airplanes, and more recently, in portable personal phones. None of the mobile or personal telephone systems have been adopted for multi-person conference type sound pick up, but have been limited to close range, single person use.

Conventional conference type telephone systems having a hands-free sound pick-up unit with a microphone adapted for receiving voice or other transmission generated a substantial distance from the microphone have all been "wired" from the microphone to the conventional telephone circuitry. Patents directed to wired conference telephone systems and mobile radio telephone systems include U.S. Pat. Nos. 3,889,059; 4,225,754; 4,291,197; 4,319,086; and 4,363,935.

Existing wired conference telephone systems include a transducer-microphone which is adapted to pick up voice and other signals generated at a distance of about 5–15 feet from the microphone. But such units, by being wired to the "hands-free unit", are designed to be positioned on a credenza or other piece of furniture, preferably at the side of a room where the wire can be "out of sight". Other placement of a conference phone on desks, tables or the like, must contend with exposure of the wiring between the microphone and the hands-free control unit telephone. Such devices do not lend themselves to placement in the middle of a large conference table or other piece of furniture positioned "out in the open" in a room. If what may be considered an unsightly wiring placement is to be avoided, positioning a wired conference telephone microphone in the center of a conference table has heretofore necessitated the placement of a hole through the table top.

Heretofore, it was also believed that the use of microphones and speakers positioned in separate chasses facing each other would present feedback problems.

A need has arisen for a wireless microphone-transmitter which can be positioned in the middle of a conference table or on other types of furniture without the interference of exposed connecting wires, particularly for use in large conference rooms such as corporate board meeting rooms, and the like.

It is therefore an object of the present invention, generally stated, to provide an improved hands-free conference telephone system wherein the voice pick-up apparatus is remotely wirelessly positioned from the remainder of the conference telephone system.

BRIEF SUMMARY OF THE INVENTION

The invention is directed to a wireless hands-free conference telephone system adapted for use in connection with a conventional telephone. The system comprises a wireless transducer/transmitter circuit for converting sound received into a first corresponding signal and radiating that sound from a position remote from the remainder of the telephone system. The system further includes a unitary control module including a receiver circuit for receiving the remotely radiated first corresponding signal and transferring it via a first signal path to an output adapted for connection to the telephone. The unitary control module further includes a loudspeaker circuit for producing sound from a second corresponding signal via a second signal path from an input adapted for connection to the telephone. Lastly, the unitary control module includes a voice switching circuit acting between the telephone and both the loudspeaker circuit and the receiver circuit on the first and second signal paths for increasing the gain in the loudspeaker circuit when the second corresponding signal is greater than the first corresponding signal, and for increasing the gain in the receiver circuit when the first corresponding signal is greater than the second corresponding signal.

BRIEF DESCRIPTION OF THE DRAWINGS

The features of the present invention, which are believed to be novel, are set forth with particularity in the appended claims. The invention may best be understood by reference to the following description of a currently preferred embodiment thereof taken in connection with the accompanying drawings in the several figures of which like references numerals identify like elements, and in which:

FIG. 1 is a perspective view of the wireless handsfree conference telephone system, constructed in accordance with the present invention, wherein the transmitter unit is positioned on a conference table in one room, and the base or control module is positioned in an adjoining room having a wall therebetween on which is mounted a loudspeaker for the incoming signal.

FIG. 2 is an elevational view of the microphone/transmitter unit.

FIG. 3 is a diagramatic view of the microphone/transmitter and unitary base-control module.

DETAILED DESCRIPTION OF THE PREFERRED EMBODIMENT

Referring to FIG. 1, the wireless hands-free conference telephone system, generally indicated at 10, includes a remotely positionable, self-powered microphone/FM transmitter, generally indicated at 11, for picking up voice signals and transmitting same to a control or base unit 12 which is connected in wired relation to a commercial telephone line, indicated in FIG. 1 by a commerial telephone 13. A loudspeaker 14 is positioned in wired relation to the control unit 12 for broadcasting the incoming signal from the commercial telephone line. In the embodiment shown in FIG. 1, the control unit 12 and commercial telephone 13 are positioned in a separate room adjacent the room in which the remote transmitter 11 and loudspeaker 14 are positioned. Loudspeaker 14 is positioned on the dividing wall 15. The microphone/transmitter 11 is preferably positioned centrally on a conference table 16 or other flat surface where it may pick up sound both directly and as reflected from the table top. Control unit 12 includes an FM receiver, a portion of the loudspeaker circuit including an amplifier 34, and a voice switching circuit 30, all to be discussed in greater detail below. The voice switching circuit monitors the incoming voice signal and the outgoing voice signal and increases the gain on the strongest signal while decreasing the gain on the weaker signal in order to avoid feedback problems as well as to provide enhanced communication capabilities between the conversing parties.

Referring to FIGS. 1,2 and 3, the microphone/transmitter 11, constructed in accordance with the present invention, is positioned in a housing 17 which, in this embodiment, has the outline, as seen in an elevational view, of a regular hexagon defining 6 rectangular side surfaces and a hexagon shape top surface. The hexagon shaped housing 17 allows equal spaced 120° positioning of 3 accoustical transducers or microphones 18—18, thus providing efficient pick up of voices or other sounds generated over a significant distance, i.e., from within about 15 feet anywhere around the unit. In a preferred embodiment 3 electret condenser microphones are utilized as their clarity of reception appears superior to other presently available microphones. As shown most clearly in FIG. 2, the microphone axis A—A is slanted downward toward the conference table top 16 or other horizontal surface on which the unit will be sitting at an angle α approximating 30° from the vertical. At this downward angle, the microphone is positioned to receive not only a direct wave from the voice or other signal source, but also a reflected wave off of the horizontal surface on which the unit is positioned. In the preferred embodiment the microphone is positioned a distance D from the floor which is as close as possible without contact, i.e. approximately ⅛ inch as a practical limit. The closeness of the microphone to the surface from which the reflected wave is received is important so that the reflected wave is not out of phase with the direct wave received by the microphone. Microphone reception is enhanced by receiving both direct wave sounds and reflected wave sounds which are in phase with each other. Out of phase sound reception tends to cause cancellation of parts of the sound.

As shown in FIG. 3, the transducer/transmitter unit 11 includes an FM transmitter 20 which transmits signals received from microphones 18—18 by radiating same from antenna 21. FM transmitter 20 is powered by battery 22, preferably a conventional 9-volt NEDA 1604 type battery. An on/off toggle switch 23 provides for selective energization of the transmitter and also includes a light emitting diode 24 which informs users that the transmitter is on and operating.

Referring to FIGS. 1 and 3, the signal which is radiated from antenna 21 of the transducer/transmitter 11 is received by the control or base unit 12 through antenna 25. Antenna 25 is mounted, in this embodiment, on the top of a housing or chassis 26, containing an FM receiver 27, which is connected to the telephone line 28 through a voice switching circuit 30 and a relay 31. Receiver 27 is driven by conventional 110-volt AC current, and the voice switching circuit 30 is driven by direct current power supply 32 receiving direct current from transformer 33 which, in turn, is connected to a conventional 110-volt AC power source at 29. Signals incoming from the telephone line are passed through relay 31 and voice switching circuit 30 into amplifier 34 and thence to speakers 14 which, in this embodiment, are positioned in remote "wired" relation to the control unit chassis 26. In the embodiment shown in FIG. 1, the telephone 13 and control unit 12 are positioned in a room separated from the conference or other room where the loudspeakers 14 and microphone/transmitter 11 are positioned, such as at a receptionist's station, or the like; although the system may be positioned all in one area if desired.

It should be noted that the frequency at which FM transmitter 11 radiates signals to receiver 27 in control unit 12 may change from locality to locality as the frequency must be on an issued frequency which is part of a "business band" regulated by the Federal Communications Commission. Hence, each unit is somewhat custom tailored during installation as to antenna height, receiver and transmitter frequency settings, etc.

The various sub-assemblies including the transmitter 20, receiver 27, voice switching circuit 30, amplifier 34, and louspeaker 14 may be of commercially available manufacture. For example, a microphone transmitter such as sold under the trademark COM-TEK M-72 and its companion recordor MR-72 may be utilized within the scope of the present invention. Any number of amplifiers, loudspeakers and direct current power supplies are usable, and the power output of the amplifier may vary depending on the number of speakers to be driven. Voice switching circuits similar to those used in existing "wired" hands-free conference telephone units may be utilized, including the PC-4B model of Precision Components, Inc., the KX-T1020 B9 Panasonic, and the QUS1B by Northern Telecom Limited.

Voice switching circuits are signal intensity descriminators which monitor background noise, and identify the loudest voice-like signal, whether it is a part of the received signal or the transmitted signal in the telephone system, the circuit then increases the gain or power of that stronger signal while descreasing the gain or power of the weaker of the signals, in order to provide a clear single signal sound in the system. As the strength of the received and transmitted signals varies, the voice switching circuit responds accordingly. Such circuitry is shown in U.S. Pat. No. 3,889,059. Further, the advent of field effect transistors (FET) with rapid switching characteristics have enhanced or shortened the response time of voice switching circuits, as shown in U.S. Pat. No. 4,319,086.

Referring to FIG. 3, the sub-assemblies, excluding the transmitter 11, and the speaker 14 if desired, may be mounted together in the unitary chassis 26 with a single on/off switch 35 and volume rheostat 36 controlling the unit. The speaker 14 may be mounted on the chassis 26 (not shown) or located remotely as shown in FIG. 1 with wired connection at conventional jacks 37 positioned at the rear of the chassis. For large conference rooms where speaking individuals may be located more than approximately 15 feet from the microphone/transmitter unit 11, two or more such units may be utilized and positioned in spaced relation, for example, along the length of a long conference table. Chassis 26 in FIG. 3 shows an additional receiver 38 in dotted line as it would be positioned in the chassis to receive FM transmission from a second microphone/transmitter unit (not shown).

Thus, a wireless hands-free conference telephone system has been shown and described which provides state-of-the-art hands-free telephone capability without the need for cumbersome wiring connections between the microphone source and the commercial telephone system.

While one preferred embodiment of the hands-free conference telephone system of the present invention has been shown and described, it will be understood by those skilled in the art that changes and modifications may be made without departing from the invention in its broader aspects. Therefore, the aim in the appended claims is to cover all such changes and modifications as fall within the true spirit and scope of the invention.

The invention is claimed as follows:

1. A wireless hands-free conference telephone accessory system adapted for use with a telephone, said system comprising:

a wireless microphone/transmitter unit constructed for receiving sounds generated from anywhere peripherally around the microphone unit both level with and above any surface on which the unit is positioned, said unit including a microphone/transmitter circuit for receiving sounds generated over a significant distance, converting said sounds received into a first corresponding signal and radiating same from a position spatially related to the remainder of said telephone system a unitary control module including a receiver circuit for receiving said radiated first corresponding signal and transferring same via a first signal path to an output adapted for connection to said telephone:

a loudspeaker circuit for producing sound from a second corresponding signal via a second signal path from an input adapted for connection to said telephone; and a voice switching circuit acting between said telephone and both said loudspeaker circuit and said receiver circuit on said first and second signal paths for increasing the gain in said loudspeaker circuit when said second corresponding signal is greater than said first corresponding signal, and for increasing the gain in said receiver circuit when said first corresponding signal is greater than said second corresponding signal.

2. The wireless hands-free conference telephone accessory system as defined in claim 1 wherein said microphone/transmitter circuit includes a distance sensitive microphone for converting sounds received into electrical signals, an FM transmitter for receiving said electrical signals from said microphone and transmitting same over a predetermined frequency, an antenna for radiating signals received from said transmitter, and a portable power supply for energizing said microphone/transmitter circuit as desired.

3. The wireless hands-free conference telephone accessory system as defined in claim 1 wherein said loudspeaker circuit includes an amplifier circuit adapted for signal path connection to a loudspeaker for increasing the amplitude of any signal passed to said loudspeaker.

4. The wireless hands-free conference telephone accessory system as defined in claim 1 wherein said voice switching circuit includes means for determining a level of background or ambient signal in the vicinity of said microphone/transmitter circuit, means responsive to voice-like signals greater in amplitude than said ambient signal for increasing the gain in said receiver circuit proportional to the difference in amplitude between said voice-like signal and said background signal, and likewise proportionally decreasing the gain in said loudspeaker circuit.

5. The wireless hands-free conference telephone accessory system of claim 1 wherein said microphone/transmitter circuit includes at least one electret microphone and an FM transmitter operative to transmit said first corresponding signal at a predetermined frequency in a prescribed band of frequencies, and said receiver circuit includes an FM receiver tuned to receive said first corresponding signal.

6. A wireless hands-free conference telephone accessory system adapted for use with a telephone, said system comprising:

a wireless microphone/transmitter unit constructed for receiving sounds generated from anywhere around the microphone unit, said unit including a wireless microphone/transmitter circuit; and a receiver circuit, a loudspeaker circuit; and a voice switching circuit, all defining portions of a unitary control module;

said wireless microphone/transmitter circuit including an electret microphone, a transmitter, a power supply and a first antenna for converting sounds received in said microphone into a first corresponding signal in said transmitter and radiating same from said first antenna from a position remote from said receiver circuit;

said receiver circuit including an FM receiver having a second antenna for receiving said remotely radiated first corresponding signal and transferring same along a conductive signal path to an output adapted for conductive connection to said telephone;

said loudspeaker circuit including an amplifier adapted for wired connection to a loudspeaker for producing audible sound from a second corresponding signal by an electrically conductive path from an input adapted for conductive connection to said telephone; and said voice switching circuit including means for sensing a level of background or ambient signal forming at least a part of said first corresponding signal from said receiver circuit; and means responsive to voice-like signals, when present in said first corresponding signal, which are greater in amplitude than said ambient signal for increasing the gain in said receiver circuit proportional to the difference in amplitude between said voice-like signal and said ambient signal, and likewise proportionally decreasing the gain in said loudspeaker circuit.

* * * * *